(12) United States Patent
Li et al.

(10) Patent No.: US 12,489,922 B2
(45) Date of Patent: Dec. 2, 2025

(54) IMAGE PROCESSING METHOD AND APPARATUS, ELECTRONIC DEVICE, AND STORAGE MEDIUM

(71) Applicant: SHANGHAI BILIBILI TECHNOLOGY CO., LTD., Shanghai (CN)

(72) Inventors: Xiaobo Li, Shanghai (CN); Tianxiao Ye, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 62 days.

(21) Appl. No.: 18/294,053

(22) PCT Filed: Jun. 14, 2022

(86) PCT No.: PCT/CN2022/098600
§ 371 (c)(1),
(2) Date: Jan. 31, 2024

(87) PCT Pub. No.: WO2023/011005
PCT Pub. Date: Feb. 9, 2023

(65) Prior Publication Data
US 2025/0088666 A1     Mar. 13, 2025

(30) Foreign Application Priority Data

Aug. 4, 2021 (CN) .......................... 202110891796.4

(51) Int. Cl.
*H04N 19/60* (2014.01)
*H04N 19/119* (2014.01)
*H04N 19/176* (2014.01)

(52) U.S. Cl.
CPC .......... *H04N 19/60* (2014.11); *H04N 19/119* (2014.11); *H04N 19/176* (2014.11)

(58) Field of Classification Search
CPC .... H04N 19/60; H04N 19/119; H04N 19/176; H04N 19/625; H04N 19/12; G06T 9/007
See application file for complete search history.

(56) References Cited

U.S. PATENT DOCUMENTS

| 2003/0081851 A1 | 5/2003 | Sadeh |
| 2020/0272425 A1* | 8/2020 | Latorre ..................... G06F 7/57 |

FOREIGN PATENT DOCUMENTS

| CN | 103745443 A | 4/2014 |
| CN | 107710763 A | 2/2018 |

(Continued)

OTHER PUBLICATIONS

International Patent Application No. PCT/CN2022/098600; Int'l Search Report; dated Aug. 26, 2022; 2 pages.

(Continued)

*Primary Examiner* — Nam D Pham
(74) *Attorney, Agent, or Firm* — BakerHostetler

(57) ABSTRACT

The present disclosure provides an image processing method and apparatus, a device, and a medium, and relates to the field of image and video processing technologies. An implementation solution includes: performing frequency domain transform on a target image and obtaining a frequency coefficient matrix of the target image, the frequency coefficient matrix including at least one non-zero frequency coefficient; determining a non-zero block in the frequency coefficient matrix based on a position of the at least one non-zero frequency coefficient; determining a corresponding transform submatrix and a corresponding transposed submatrix of the non-zero block; and determining an inverse transform result of the frequency coefficient matrix based on the transform submatrix, the non-zero block, and the transposed submatrix.

20 Claims, 6 Drawing Sheets

(56) References Cited

FOREIGN PATENT DOCUMENTS

| | | |
|---|---|---|
| CN | 108574849 A | 9/2018 |
| CN | 111741302 A | 10/2020 |
| CN | 111953999 A | 11/2020 |
| CN | 113068037 A | 7/2021 |
| CN | 113207002 A | 8/2021 |
| CN | 113592966 A | 11/2021 |

OTHER PUBLICATIONS

Ruan et al.; "On Image Watermarking Algorithm Based on Frequency Domain Transformation and Geometric Distortion Correction"; Journal of Southwest China Normal University; vol. 44 No. 10; Oct. 2019; p. 54-65 (English Abstract see p. 65).

Liu Zhe; "Research on Rate-Control for Video Compressed Sensing Coding"; Xidian University Electronics and Science and Technology; Master Thesis; Jan. 2013; 65 pages (English Abstract see p. 4).

Guo Jie; "The Study of Image/Video Signal Processing Methods in the Compressed Domain Based on Compressed Sensing"; Xidian University Electronics and Science and Technology; Doctoral Dissertation; Apr. 2017; 118 pages (English Abstract see pp. 7-9).

\* cited by examiner

200

S210 Obtain a frequency coefficient matrix of a target image, where the frequency coefficient matrix is obtained by performing frequency domain transform on the target image and includes at least one non-zero frequency coefficient S220 Determine a non-zero block in the frequency coefficient matrix based on a position of the at least one non-zero frequency coefficient S230 Determine a corresponding transform submatrix and a corresponding transposed submatrix of the non-zero block S240 Determine an inverse transform result of the frequency coefficient matrix based on the transform submatrix, the non-zero block, and the transposed submatrix

FIG. 2

IMAGE PROCESSING METHOD AND APPARATUS, ELECTRONIC DEVICE, AND STORAGE MEDIUM

CROSS-REFERENCE TO RELATED APPLICATION

The present disclosure is the U.S. National Stage of International Application No. PCT/CN2022/098600, filed on Jun. 14, 2022, which claims priority to Chinese Patent Application No. 202110891796.4, filed on Aug. 4, 2021, both of which are incorporated herein by reference in their entireties.

TECHNICAL FIELD

The present disclosure relates to the field of image and video processing technologies, and specifically to an image processing method, an image processing apparatus, an electronic device, a computer-readable storage medium, and a computer program product.

BACKGROUND ART

Image or video data has strong spatial correlation, and has a lot of redundant information in a spatial domain. The transform encoding technology may transform image or video data from a spatial domain to a frequency domain, which greatly reduces redundant information, to compress the image or video data, thereby helping store and transmit the image or video data.

For example, in a video compression scenario, each video frame may be subjected to processing such as prediction, transform, quantization, inverse quantization, inverse transform, reconstruction, and entropy encoding on an encoder side, to obtain a code of each video frame; then encoded data is subjected to processing such as entropy decoding, inverse quantization, and inverse transform on a decoder side, to restore each video frame. A video encoding process and a video decoding process each include inverse transform processing. The inverse transform processing requires a large amount of calculation, has low calculation efficiency, and needs to occupy a large amount of memory space, which greatly limits the efficiency of video coding.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY OF THE INVENTION

The present disclosure provides an image processing method, an image processing apparatus, an electronic device, a computer-readable storage medium, and a computer program product.

According to an aspect of the present disclosure, there is provided an image processing method, including: obtaining a frequency coefficient matrix of a target image, where the frequency coefficient matrix is obtained by performing frequency domain transform on the target image and includes at least one non-zero frequency coefficient; determining a non-zero block in the frequency coefficient matrix based on a position of the at least one non-zero frequency coefficient; determining a corresponding transform submatrix and a corresponding transposed submatrix of the non-zero block; and determining an inverse transform result of the frequency coefficient matrix based on the transform submatrix, the non-zero block, and the transposed submatrix.

According to another aspect of the present disclosure, there is further provided an image processing apparatus, including: an obtaining unit configured to obtain a frequency coefficient matrix of a target image, where the frequency coefficient matrix is obtained by performing frequency domain transform on the target image and includes at least one non-zero frequency coefficient; a non-zero block determining unit configured to determine a non-zero block in the frequency coefficient matrix based on a position of the at least one non-zero frequency coefficient; a matrix determining unit configured to determine a corresponding transform submatrix and a corresponding transposed submatrix of the non-zero block; and an inverse transform unit configured to determine an inverse transform result of the frequency coefficient matrix based on the transform submatrix, the non-zero block, and the transposed submatrix.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program, where the computer program, when executed by a processor, implements the above method.

According to another aspect of the present disclosure, there is further provided a computer program product, including a computer program, where the computer program, when executed by a processor, implements the above method.

According to one or more embodiments of the present disclosure, the non-zero block in the frequency coefficient matrix of the target image is determined, and calculation is only performed for the non-zero block to obtain the inverse transform result of the frequency coefficient matrix, without performing calculation for other frequency coefficients (i.e., frequency coefficients other than the non-zero block) in the frequency coefficient matrix, such that the calculation amount of inverse transform is greatly reduced, and the calculation efficiency of the inverse transform is improved, thereby improving the efficiency of image or video coding.

It should be understood that the content described in this section is not intended to identify critical or important features of the embodiments of the present disclosure, and is not used to limit the scope of the present disclosure either. Other features of the present disclosure will be easily understood through the following description.

BRIEF DESCRIPTION OF THE DRAWINGS

The accompanying drawings exemplarily show embodiments and form a part of the specification, and are used to explain exemplary implementations of the embodiments together with a written description of the specification. The embodiments shown are merely for illustrative purposes and do not limit the scope of the claims. Throughout the accompanying drawings, the same reference numerals denote similar but not necessarily same elements.

FIG. 2 is a flowchart of an image processing method according to an embodiment of the present disclosure;

DETAILED DESCRIPTION OF EMBODIMENTS

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

The embodiments of the present disclosure will be described below in detail with reference to the accompanying drawings.

For ease of understanding, a brief introduction of an image or video transform encoding process is given first.

Figure 1A:
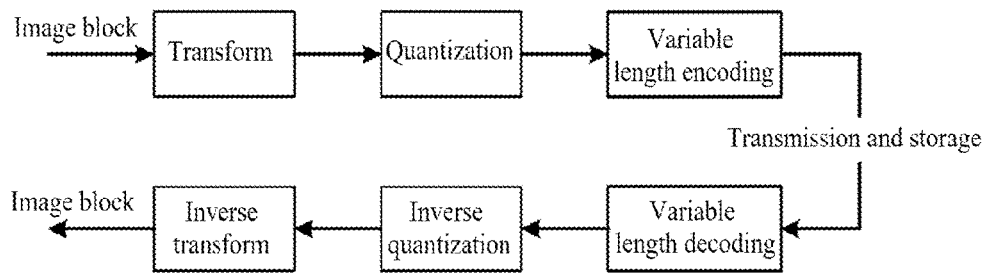
FIG. 1A is a schematic diagram of an image coding process according to an embodiment of the present disclosure.

The general process of image encoding is as follows: An image is divided into a plurality of image blocks and is transformed and encoded with the image block as a transform unit (TU). The image block may be, for example, a square image with a size of 4*4, 8*8, 16*16, or 32*32, or a rectangular image. As shown in FIG. 1A, in the image encoding process, each image block is transformed, and image block data is transformed from a spatial domain to a frequency domain, to eliminate redundant information in the image block, so as to obtain a transform coefficient matrix of the image block in the frequency domain. A transform method may be, for example, discrete cosine transform (DCT), discrete sine transform (DST), etc. The transform coefficient matrix obtained through transform is quantized, and variable length encoding (such as Huffman encoding) is performed on a quantized result, to obtain an encoded result.

The general process of image decoding is as follows: As shown in FIG. 1A, variable length decoding, inverse quantization, and inverse transform are performed on the encoded result of each image block, to obtain a decoded image block. Inverse transform is an inverse process of transform, and an inverse transform method may be, for example, inverse discrete cosine transform (IDCT), inverse discrete sine transform (IDST), etc.

The general process of video encoding is as follows: An original video frame is divided into a plurality of image blocks and is transformed and encoded with the image block as a TU. The image block may be, for example, a square image with a size of 4*4, 8*8, 16*16, or 32*32, or a rectangular image. Any video frame may be composed of multiple different channels, for example, a YUV video frame is composed of a luma channel (Y), a first chroma channel (U), and a second chroma channel (V). Accordingly, a video frame may include a plurality of image blocks of different channels, for example, a YUV video frame may include a luma image block, a first chroma image block, and a second chroma image block.

Figure 1B:
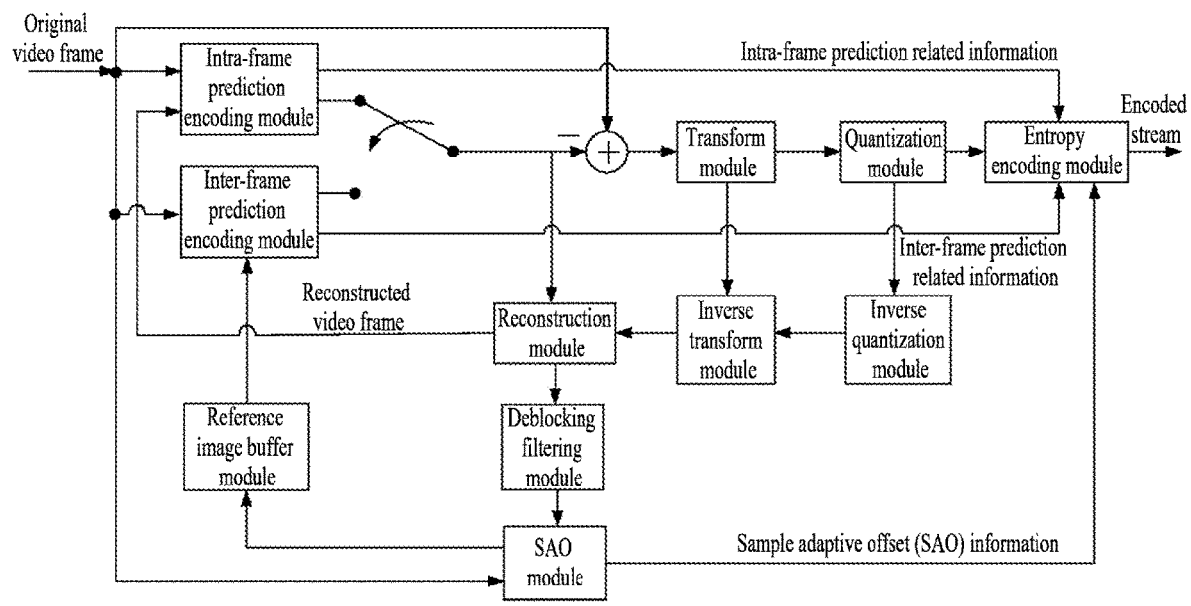
FIG. 1B is a schematic diagram of a structure of a video encoder side according to an embodiment of the present disclosure.

As shown in FIG. 1B, an encoder side may include an intra-frame prediction encoding module, an inter-frame prediction encoding module, a transform module, a quantization module, an entropy encoding module, an inverse quantization module, an inverse transform module, a reconstruction module, a filtering module, and a reference image buffer module, which are configured to perform processing such as prediction, transform, quantization, entropy encoding, inverse quantization, inverse transform, reconstruction, and filtering on the original video frame, respectively, to finally output an encoded stream of a video.

As shown in FIG. 1B, in the video encoding process, the original video frame is used as an input of an adder, predicted data outputted by the intra-frame prediction encoding module or the inter-frame prediction encoding module is used as another input of the adder, and the adder outputs a predicted residual matrix. The predicted residual matrix is subjected to transform and quantization processing, to obtain a residual coefficient matrix. The residual coefficient matrix is subjected to inverse quantization and inverse transform processing, to restore the predicted residual matrix. The restored predicted residual matrix may be used to reconstruct the video frame. A method for transform processing may be, for example, DCT, DST, etc. Inverse transform is an inverse process of transform, and accordingly, a method for inverse transform processing may be, for example, IDCT, IDST, etc.

Figure 1C:
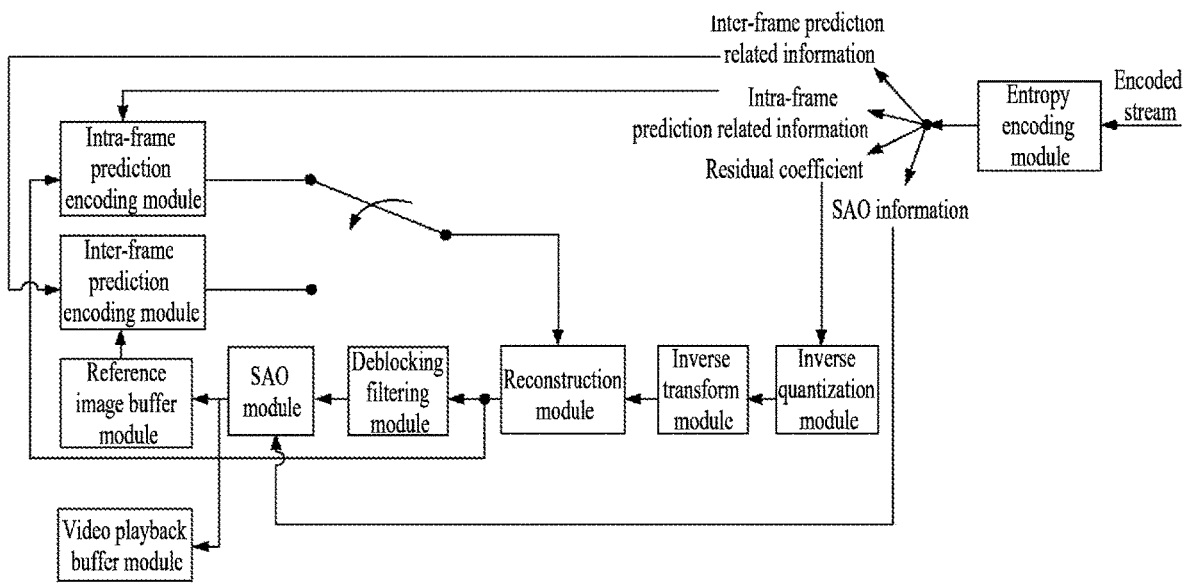
FIG. 1C is a schematic diagram of a structure of a video decoder side according to an embodiment of the present disclosure.

The general process of video decoding is as follows: As shown in FIG. 1C, the received encoded stream is first subjected to entropy decoding, to obtain the residual coefficient matrix, inter-frame prediction related information, intra-frame prediction related information, etc. The residual coefficient matrix is subjected to inverse quantization and inverse transform processing, to restore the predicted residual matrix. The reconstruction module adds a predicted residual back to corresponding intra-frame prediction data or inter-frame prediction data. The intra-frame prediction data or the inter-frame prediction data may be selected for use by using a switch, to obtain a reconstructed frame. Accordingly, a decoder side may include an intra-frame prediction decoding module, an inter-frame prediction decoding module, an entropy decoding module, an inverse quantization module, an inverse transform module, a reconstruction module, a filtering module, a reference image buffer module, and a video playback buffer module.

From the above introduction, it can be learned that inverse transform processing may be applied to image decoding (for inverse transform of the transform coefficient matrix), video coding (for inverse transform of the residual coefficient matrix), and other processes. The inverse transform processing requires a large amount of calculation.

The residual coefficient matrix X is subjected to inverse transform by using an example where an application scenario is video coding, a size of a TU is 8*8 (i.e., a size of the residual coefficient matrix is 8*8), and a method for inverse transform is IDCT, that is, calculation as shown in the following formula is performed:

$$Y = H_8^T X H_8$$

where Y is a result matrix obtained through inverse transform processing, $H_8$ is a DCT matrix of 8*8, X is a residual coefficient matrix to be subjected to inverse transform, and $H_8^T$ is a transposed matrix of $H_8$.

It should be noted that elements in the DCT matrix $H_8$ are calculated through a cosine function, and values thereof are usually floating point numbers. For ease of storage and calculation, the transform matrix $H_8$ may be represented as a product of a common factor of a floating point number and an integer matrix, and accordingly, the transposed matrix $H_8^T$ of the transform matrix $H_8$ may alternatively be represented as a product of the same common factor and an integer matrix $H^T$. For example, the common factor of the transform matrix $H_8$ of 8*8 and the transposed matrix $H_8^T$ thereof may be 0.0055, the integer matrix H corresponding to the corresponding transform matrix $H_8$ is as follows:

$$H = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{bmatrix}$$

the integer matrix $H^T$ corresponding to the transposed matrix $H_8^T$ is as follows:

$$H^T = \begin{bmatrix} 64 & 89 & 83 & 75 & 64 & 50 & 36 & 18 \\ 64 & 75 & 36 & -18 & -64 & -89 & -83 & -50 \\ 64 & 50 & -36 & -89 & -64 & 18 & 83 & 75 \\ 64 & 18 & -83 & -50 & 64 & 75 & -36 & -89 \\ 64 & -18 & -83 & 50 & 64 & -75 & -36 & 89 \\ 64 & -50 & -36 & 89 & -64 & -18 & 83 & -75 \\ 64 & -75 & 36 & 18 & -64 & 89 & -83 & 50 \\ 64 & -89 & 83 & -75 & 64 & -50 & 36 & -18 \end{bmatrix}$$

and accordingly, the result matrix Y may be represented as: $Y = 0.0055 * 0.0055 * H^T X H$.

For ease of description, hereinafter, the integer matrix corresponding to the transform matrix is used to refer to the transform matrix, and the integer matrix corresponding to the transposed matrix of the transform matrix is used to refer to the transposed matrix.

The residual coefficient matrix X is as follows:

$$X = \begin{bmatrix} A00 & A01 & A02 & A03 & A04 & A05 & A06 & A07 \\ A10 & A11 & A12 & A13 & A14 & A15 & A16 & A17 \\ A20 & A21 & A22 & A23 & A24 & A25 & A26 & A27 \\ A30 & A31 & A32 & A33 & A34 & A35 & A36 & A37 \\ A40 & A41 & A42 & A43 & A44 & A45 & A46 & A47 \\ A50 & A51 & A52 & A53 & A54 & A55 & A56 & A57 \\ A60 & A61 & A62 & A63 & A64 & A65 & A66 & A67 \\ A70 & A71 & A72 & A73 & A74 & A75 & A76 & A77 \end{bmatrix}$$

If a matrix multiplication operation is performed directly according to the above formula, it is required to perform matrix multiplication on $H^T$ and X first and then perform matrix multiplication on a multiplication result and H, resulting in a large calculation amount.

In related technologies, a butterfly operation may be used to accelerate a calculation process of inverse transform. The process of calculating $Y = H^T X H$ through the butterfly operation is as follows:

In step 1, $B = H^T X$ is calculated; common terms are extracted:

$$O0 = 89 \times A10 + 75 \times A30 + 50 \times A50 + 18 \times A70$$

$$O1 = 75 \times A10 - 18 \times A30 - 89 \times A50 - 50 \times A70$$

$$O2 = 50 \times A10 - 89 \times A30 + 18 \times A50 + 75 \times A70$$

$$O3 = 18 \times A10 - 50 \times A30 + 75 \times A50 - 89 \times A70$$

$$EE0 = 64 \times A00 + 64 \times A40$$

$$EE1 = 64 \times A00 - 64 \times A40$$

$$EO0 = 83 \times A20 + 36 \times A60$$

$$EO1 = 39 \times A20 - 83 \times A60$$

$$E0 = EE0 + EO0$$

$$E1 = EE1 + EO0$$

$$E2 = EE1 - EO1$$

$$E3 = EE0 - EO0;$$

a first column in a matrix B may be calculated through the common terms:

$$B00 = E0 + O0$$

$$B10 = E1 + O1$$

$$B20 = E2 + O2$$

$$B30 = E3 + O3$$

$$B40 = E3 - O3$$

$$B50 = E2 - O2$$

$$B60 = E1 - O1$$

$$B70 = E0 - O0;$$

and second to eight columns in the matrix B may be calculated by the similar method.

In step 2, Y=BH is calculated in the similar way to that in the step 1.

The inventor found through research that in a frequency coefficient matrix (such as the transform coefficient matrix and the residual coefficient matrix mentioned above) obtained by performing transform (quantization and inverse quantization may further be performed after transform) on the TU, only a portion at an upper left corner usually has a non-zero frequency coefficient, and values of most other frequency coefficients are all zero.

An 8-bit image (i.e., a pixel value of each channel of each pixel in the image is represented by one byte) is used as an example. The TU of a luma channel (i.e., a channel Y) of 8*8 is subjected to transform, quantization, and inverse quantization, to obtain a frequency coefficient matrix X as follows:

$$X = \begin{bmatrix} 0 & 0 & 0 & 0 & 0 & 0 & 0 & 0 \\ 72 & 0 & 0 & 72 & 0 & 0 & 0 & 0 \\ 72 & -72 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

It can be learned that the frequency coefficient matrix X only has four non-zero frequency coefficients located in a region at the upper left corner, and values of other frequency coefficients are all zero. If the frequency coefficient matrix X is subjected to inverse transform by directly performing the matrix multiplication or butterfly operation, many calculations will be invalid, because results of addition, subtraction, multiplication and division operations on zero are still zero, resulting in a lot of waste of storage and calculation resources.

In view of this, the present disclosure provides an improved image processing method. In the method, a frequency coefficient matrix of a target image is obtained, a non-zero block in the frequency coefficient matrix is determined based on a position of at least one non-zero frequency coefficient included in the frequency coefficient matrix, a transform matrix and a transposed matrix of the transform matrix are cropped separately based on the non-zero block to obtain a transform submatrix and a transposed submatrix, and then an inverse transform result of the frequency coefficient matrix is determined based on the transform submatrix, the non-zero block, and the transposed submatrix. In the image processing method according to this embodiment of the present disclosure, the non-zero block in the frequency coefficient matrix of the target image is determined, and calculation is only performed for the non-zero block to obtain the inverse transform result of the frequency coefficient matrix, without performing calculations for other frequency coefficients (i.e., frequency coefficients other than the non-zero block) in the frequency coefficient matrix, such that the calculation amount of inverse transform is greatly reduced, and the calculation efficiency of the inverse transform is improved, thereby improving the efficiency of image or video coding.

The image processing method in this embodiment of the present disclosure will be described in detail below with reference to the accompanying drawings.

FIG. 2 is a flowchart of an image processing method 200 according to an embodiment of the present disclosure. The method 200 may be applied to, for example, a scenario of image decoding or video coding, to improve the calculation efficiency of inverse transform, thereby improving the efficiency of image decoding and video coding.

As shown in FIG. 2, the method 200 may include:

step S210: obtaining a frequency coefficient matrix of a target image, where the frequency coefficient matrix is obtained by performing frequency domain transform on the target image and includes at least one non-zero frequency coefficient;

step S220: determining a non-zero block in the frequency coefficient matrix based on a position of the at least one non-zero frequency coefficient;

step S230: determining a corresponding transform submatrix and a corresponding transposed submatrix of the non-zero block; and step S240: determining an inverse transform result of the frequency coefficient matrix based on the transform submatrix, the non-zero block, and the transposed submatrix.

According to this embodiment of the present disclosure, the non-zero block in the frequency coefficient matrix of the target image is determined, and calculation is only performed for the non-zero block to obtain the inverse transform result of the frequency coefficient matrix, without performing calculations for other frequency coefficients (i.e., frequency coefficients other than the non-zero block) in the frequency coefficient matrix, such that the calculation amount of inverse transform is greatly reduced, and the calculation efficiency of the inverse transform is improved, thereby improving the efficiency of image or video coding.

The target image may be, but is not limited to, a single image or an image block (i.e., a TU) in a video frame. For example, the target image may be an image block in an image to be decoded, an image block in a video frame to be encoded, or an image block in a video frame to be decoded. Further, the target image may be, for example, an image block of a luma channel in a video frame or an image block of another channel. For example, for a YUV video frame, the target image may alternatively be an image block of a first chroma channel or an image block of a second chroma channel.

The frequency coefficient matrix of the target image is obtained by performing frequency domain transform on the target image. As mentioned above, the frequency coefficient matrix may be, for example, a transform coefficient matrix obtained by performing frequency domain transform on the image block of the image, or a residual coefficient matrix obtained by performing frequency domain transform, quantization, and inverse quantization on a predicted residual of the image block in the video frame. A method for performing the frequency domain transform on the target image includes, but is not limited to, DCT, DST, etc.

The target image may be, for example, a square image with equal width and height such as of 4*4, 8*8, 16*16, or 32*32. Accordingly, the frequency coefficient matrix obtained by performing the frequency domain transform on the target image may be a matrix (i.e., a square matrix) with an equal number of rows and columns such as of 4*4, 8*8, 16*16, or 32*32. The target image may alternatively be, for example, a rectangular image with unequal width and height such as of 4*8, 8*4, 4*16, 16*4, 8*16, 16*8, 16*32, 32*16, 8*32, or 32*8. Accordingly, the frequency coefficient matrix obtained by performing the frequency domain transform on the target image may be a matrix with an unequal number of rows and columns such as of 4*8, 8*4, 4*16, 16*4, 8*16, 16*8, 16*32, 32*16, 8*32, or 32*8.

According to some embodiments, step S220 may include: determining a maximum row coordinate value and a maximum column coordinate value that are corresponding to the at least one non-zero frequency coefficient; and determining the non-zero block based on the maximum row coordinate value and the maximum column coordinate value. As mentioned above, because the non-zero frequency coefficient in the frequency coefficient matrix is usually located in a region at an upper left corner of the matrix, a position region of the non-zero frequency coefficient in the non-zero frequency coefficient matrix can be determined based on the maximum row coordinate value and the maximum column coordinate value that are corresponding to the at least one non-zero frequency coefficient in the frequency coefficient matrix, so that the non-zero block in the frequency coefficient matrix is determined.

In this embodiment of the present disclosure, a row coordinate of the frequency coefficient may refer to a row where the frequency coefficient is located in the frequency coefficient matrix, and a column coordinate of the frequency coefficient may refer to a column where the frequency coefficient is located in the frequency coefficient matrix.

According to some embodiments, the non-zero block includes one or more frequency coefficients whose corresponding row coordinates are less than or equal to the maximum row coordinate value and whose corresponding column coordinates are less than or equal to the maximum column coordinate value in the frequency coefficient matrix. Because the non-zero frequency coefficient in the frequency coefficient matrix is usually located in the region at the upper left corner of the matrix, the maximum row coordinate value and the maximum column coordinate value correspond to a non-zero frequency coefficient at a bottom rightmost corner in the frequency coefficient matrix. The non-zero block includes the frequency coefficients whose row coordinates are less than or equal to the maximum row coordinate value and whose column coordinates are less than or equal to the maximum column coordinate value in the frequency coefficient matrix, such that it can be ensured that the non-zero block includes all non-zero frequency coefficients in the frequency coefficient matrix, making it possible to perform lossless (i.e., no information loss) inverse transform on the frequency coefficient matrix in subsequent steps.

According to some embodiments, the non-zero block may include one or more frequency coefficients whose corresponding row coordinates are less than or equal to the maximum row coordinate value and whose corresponding column coordinates are less than or equal to the maximum column coordinate value in the frequency coefficient matrix. In other words, the non-zero block is a block, with a size of the maximum row coordinate value*the maximum column coordinate value, located at the upper left corner of the frequency coefficient matrix.

According to some other embodiments, the non-zero block can be determined according to the following steps: determining a maximum row boundary value of the non-zero block based on the maximum row coordinate value; and determining a maximum column boundary value of the non-zero block based on the maximum column coordinate value, where the maximum row boundary value is a minimum power of 2 that is greater than or equal to the maximum row coordinate value, and the maximum column boundary value is a minimum power of 2 that is greater than or equal to the maximum column coordinate value. Accordingly, the non-zero block includes all frequency coefficients whose row coordinates are less than or equal to the maximum row boundary value and whose column coordinates are less than or equal to the maximum column boundary value in the frequency coefficient matrix. Both the maximum row boundary value and the maximum column boundary value are the powers of 2. The maximum row coordinate value and the maximum column coordinate value are respectively expanded to the maximum row boundary value and the maximum column boundary value, and the non-zero block is determined based on the maximum row boundary value and the maximum column boundary value, such that both the number of rows and the number of columns in the determined non-zero block are powers of 2, thus helping implement instruction set optimization, improving the utilization efficiency of memory space in the subsequent calculation process for inverse transform, and accelerating the calculation process.

The frequency coefficient matrix X is used as an example, the frequency coefficient matrix X includes four non-zero frequency coefficients with position coordinates being (2, 1), (2, 4), (3, 1), and (3, 2), respectively. Therefore, the maximum row coordinate value of the non-zero frequency coefficient is max(2, 2, 3, 3)=3, and the maximum column coordinate value is max(1, 4, 1, 2)=4. The minimum power of 2 that is greater than or equal to the maximum row coordinate value of 3 is 4, that is, the maximum row boundary value is 4. The minimum power of 2 that is greater than or equal to the maximum column coordinate value of 4 is 4, that is, the maximum column boundary value is 4. Accordingly, the non-zero block includes all frequency coefficients whose row coordinates are less than or equal to the maximum row boundary value of 4 and whose column coordinates are less than or equal to the maximum column boundary value of 4 in the frequency coefficient matrix, that is, the non-zero block is a region of 4*4 at the upper left corner of the frequency coefficient matrix X. In other words, the non-zero block C is as follows:

$$C = \begin{bmatrix} 0 & 0 & 0 & 0 \\ 72 & 0 & 0 & 72 \\ 72 & -72 & 0 & 0 \\ 0 & 0 & 0 & 0 \end{bmatrix}$$

According to some embodiments, step S230 may include: determining a preset transform matrix and a transposed matrix of the transform matrix based on the frequency coefficient matrix; and cropping, based on the non-zero block, the transform matrix to obtain the transform submatrix, and cropping the transposed matrix to obtain the transposed submatrix.

According to some embodiments, the transform matrix and the transposed matrix thereof can be determined based on a size of the frequency coefficient matrix. Specifically, a size of the transform matrix can be determined based on the size of the frequency coefficient matrix.

When the frequency coefficient matrix is a matrix (i.e., a square matrix) with an equal number of rows and columns such as of 4*4, 8*8, 16*16, or 32*32, the size of the transform matrix H is the same as that of the frequency coefficient matrix, that is, the transform matrix is a square matrix with the number of rows and the number of columns both equal to the number of rows (or the number of columns) in the frequency coefficient matrix. For example, when the frequency coefficient matrix is a square matrix of 8*8, the corresponding transform matrix H and the transposed matrix $H^T$ thereof are also square matrices of 8*8.

When the frequency coefficient matrix is a matrix with an unequal number of rows and columns such as of 4*8, 8*4, 4*16, 16*4, 8*16, 16*8, 16*32, 32*16, 8*32, or 32*8, the transform matrix H is a square matrix with the number of rows and the number of columns both equal to the number of columns in the frequency coefficient matrix, and the matrix $H^T$ is a square matrix with the number of rows and the number of columns both equal to the number of rows in the frequency coefficient matrix. For example, when the frequency coefficient matrix is a matrix of 8*4, the corresponding transform matrix H is a square matrix of 4*4, and $H^T$ is a square matrix of 8*8.

Each element in the transform matrix can be calculated according to a preset formula and based on the size of the determined transform matrix, so as to obtain the transform matrix. Further, the transform matrix is transposed to obtain the transposed matrix of the transform matrix.

For example, when the size of the frequency coefficient matrix is 8*8, the size of the transform matrix is 8*8 accordingly. An example where inverse transform is IDCT is used as an example. When the transform matrix is a square matrix (that is, the number of rows in the transform matrix is same as that of columns therein), an element $D_{i,j}$ in an $i^{th}$ row and a $j^{th}$ column in the transform matrix can be calculated according to the following formula:

$$D_{i,j} = \sqrt{\frac{2}{N}} k(i) \cos\frac{(2j+1)i\pi}{2N}, \quad k(i) = \begin{cases} 1/\sqrt{2}, & i=0 \\ 1, & \text{another} \end{cases}$$

where N is the number of rows (or the number of columns) in the transform matrix. It can be understood that the element calculated according to the above formula is a floating point number $D_{i,j}$. According to some embodiments, the element $D_{i,j}$ in the transform matrix can be scaled down to be transformed into an integer, thus making it convenient for processing by a computer. Specifically, a scaling factor of $D_{i,j}$ may be determined according to different application scenarios. For example, different scaling factors may be set for different video encoding standards. For a high efficiency video coding (HEVC) standard, elements in the transform matrix can be expanded by 128 times. For an AV1 video encoding standard, elements in the transform matrix can be expanded by 8,192 times.

According to some embodiments, based on a size of the non-zero block, the transform matrix can be cropped to obtain the transform submatrix, and the transposed matrix of the transform matrix can be cropped to obtain the transposed submatrix. The transform submatrix and the transposed submatrix that are obtained by cropping are adapted to the non-zero block in size, and can be subjected to a matrix multiplication operation with the non-zero block.

The transform matrix H of 8*8 and the transposed matrix $H^T$ thereof are still used as an example, the transposed matrix $H^T$ is cropped based on a non-zero block C of 4*4, to obtain a transposed submatrix $H^{T'}$ of 8*4:

$$H^{T'} = \begin{bmatrix} 64 & 89 & 83 & 75 \\ 64 & 75 & 36 & -18 \\ 64 & 50 & -36 & -89 \\ 64 & 18 & -83 & -50 \\ 64 & -18 & -83 & 50 \\ 64 & -50 & -36 & 89 \\ 64 & -75 & 36 & 18 \\ 64 & -89 & 83 & -75 \end{bmatrix}$$

the transform matrix H of 8*8 is cropped to obtain a transform submatrix H' of 4*8:

$$H' = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \end{bmatrix}$$

It can be understood that the transform submatrix and transposed submatrix may alternatively be directly determined based on the size of the non-zero block. A specific method is similar to that for determining the transform matrix and the transposed matrix based on the frequency coefficient matrix, and thus will not be detailed herein.

After the corresponding transform submatrix and transposed submatrix of the non-zero block are determined, step S240 can be performed, to determine the inverse transform result of the frequency coefficient matrix.

According to some embodiments, step S240 may be performed in response to at least one of the following conditions: the maximum row boundary value of the non-zero block is less than a total number of rows in the frequency coefficient matrix; and the maximum column boundary value of the non-zero block is less than a total number of columns in the frequency coefficient matrix.

When the maximum row boundary value is less than the total number of rows in the frequency coefficient matrix, and/or the maximum column boundary value is less than the total number of columns in the frequency coefficient matrix, the size of the non-zero block determined based on the maximum row boundary value and the maximum column boundary value is less than the size of the frequency coefficient matrix. Therefore, determining the inverse transform result of the frequency coefficient matrix based on the non-zero block can reduce the calculation amount of inverse transform and improve the calculation efficiency.

When the maximum row boundary value is greater than or equal to the total number of rows in the frequency coefficient matrix, and the maximum column boundary value is greater than or equal to the total number of columns in the frequency coefficient matrix, the size of the non-zero block determined based on the maximum row boundary value and the maximum column boundary value will be greater than or equal to the size of the frequency coefficient matrix. Therefore, the technical effects of reducing the calculation amount and improving the calculation efficiency cannot be achieved. In this case, step S240 may be performed to perform inverse transform on the frequency coefficient matrix, or a conventional method (such as a method for directly performing a matrix multiplication or butterfly operation on the frequency coefficient matrix) may be directly used to perform inverse transform on the frequency coefficient matrix without performing step S240.

According to some embodiments, step S240 may include: performing a matrix multiplication operation on the transposed submatrix and the non-zero block based on a SIMD instruction, to obtain an intermediate matrix; and performing a matrix multiplication operation on the intermediate matrix and the transform submatrix based on the SIMD instruction, to obtain the inverse transform result of the frequency coefficient matrix.

SIMD (Single Instruction Multiple Data) can copy multiple operands and pack them in a large register for parallel computing. Common SIMD instruction sets include MMX, SSE, and AVX instruction sets of an X86 architecture, an NEON instruction set of an ARM Cortex architecture, an X-Burst instruction set of an MIPS architecture, etc. Based on the SIMD instruction, the matrix multiplication operation is performed on the transposed submatrix and the non-zero block, and the matrix multiplication operation is performed on the intermediate matrix and the transform submatrix, which can improve the calculation efficiency of inverse transform, thus improving the efficiency of video coding.

According to some embodiments, to obtain every multiple adjacent rows (such as every two adjacent rows and every four adjacent rows) of elements in the intermediate matrix, the matrix multiplication operation can be performed on the transposed submatrix and the non-zero block based on the SIMD instruction according to the following steps S351 to S356:

Step S351: Divide multiple adjacent rows in the transposed submatrix that are corresponding to the multiple adjacent rows in the intermediate matrix into at least one first block.

Step S352: Divide the non-zero block into at least one second block based on the at least one first block, where a number of columns in the first block is the same as a number of rows in the second block.

Step S353: After each row of elements in each first block are copied for multiple times, perform rearrangement by rows, to obtain a first row matrix corresponding to each first block, where a number of times each row of elements in each first block are copied is the same as a number of columns in each second block.

Step S354: Rearrange elements in each second block by columns, to obtain a second row matrix corresponding to each second block.

Step S355: Multiply, based on the SIMD instruction, each element in the first row matrix of each first block and an element at a corresponding position in a second row matrix of a corresponding second block, and calculate a sum of results obtained by performing the multiplication on multiple adjacent elements in the first row matrix that are corresponding to each row in the first block, to obtain a third row matrix.

Step S356: Add elements at corresponding positions in one or more respectively corresponding third row matrices of one or more first blocks in the same row, to obtain a corresponding row in the intermediate matrix.

For steps S351 and S352, there are multiple ways of dividing multiple adjacent rows in the transposed submatrix into at least one first block and dividing the non-zero block into at least one second block.

According to some embodiments, the non-zero block may be divided by rows, and accordingly, at least one second block obtained by division is distributed along a row direction, and each second block includes at least one complete row in the non-zero block. A size of the first block may be determined based on a size of the second block, for example, the number of rows in the first block corresponds to the number of the multiple adjacent rows in the intermediate matrix, and the number of columns in the first block is the same as the number of rows in the second block.

According to some other embodiments, the non-zero block may be divided by rows and columns, and accordingly, at least one second block obtained through division is distributed in a matrix, where each second block includes some of rows and some of columns in the non-zero block, that is, each second block does not include complete rows or complete columns in the non-zero block. A size of the first block may be determined based on a size of the second block, for example, the number of rows in the first block corresponds to the number of the multiple adjacent rows in the intermediate matrix, and the number of columns in the first block is the same as the number of rows in the second block.

More specifically, according to some embodiments, for steps S351 and S352, in response to determining that the number of rows in the non-zero block is greater than or equal to 2 (for example, the number of rows is 2, 4, 8, 16, 32, etc.) and the number of columns therein is greater than or equal to 4 (for example, the number of columns is 4, 8, 16, 32, etc.), the multiple adjacent rows in the transposed submatrix are divided into at least one first block of 2*2, and the non-zero block is divided into at least one second block of 2*4.

According to some other embodiments, for steps S351 and S352, in response to determining that the number of rows in the non-zero block is greater than or equal to 2 (for example, the number of rows is 2, 4, 8, 16, 32, etc.) and the number of columns therein is equal to 2, the multiple adjacent rows in the transposed submatrix are divided into at least one first block of 4*2, and the non-zero block is divided into at least one second block of 2*2.

Hereinafter, the transposed submatrix $H^{T'}$ and the non-zero block C (elements in the transposed submatrix $H^{T'}$ and the non-zero block C are all 2-byte integer values) are still used as an example, and that the SIMD instruction is an AVX instruction is used as an example for description, the process of calculating every two rows of elements in the intermediate matrix based on the SIMD instruction according to steps S351 to S356 is described.

First, first two rows of elements in the intermediate matrix are calculated according to steps S351 to S356.

For steps S351 and S352, because both the number of rows and the number of columns in the non-zero block C are 4, a condition that the number of rows is greater than or equal to 2 and the number of columns is greater than or equal to 4 is met. Therefore, first two rows of the transposed submatrix $H^{T'}$ may be divided into two first blocks 402 and 404 each of 2*2, and the non-zero block C may be divided into two second blocks 406 and 408 each of 2*4.

For step S353, because the number of columns in the second block is 4, each row of elements in a first block 402 are copied for four times and then rearranged by rows (an arrangement direction is as shown by the arrow in FIG. 4), to obtain a first row matrix 410. Similarly, each row of elements in a first block 404 are copied for four times and then rearranged by rows, to obtain a first row matrix 412.

Figure 4:
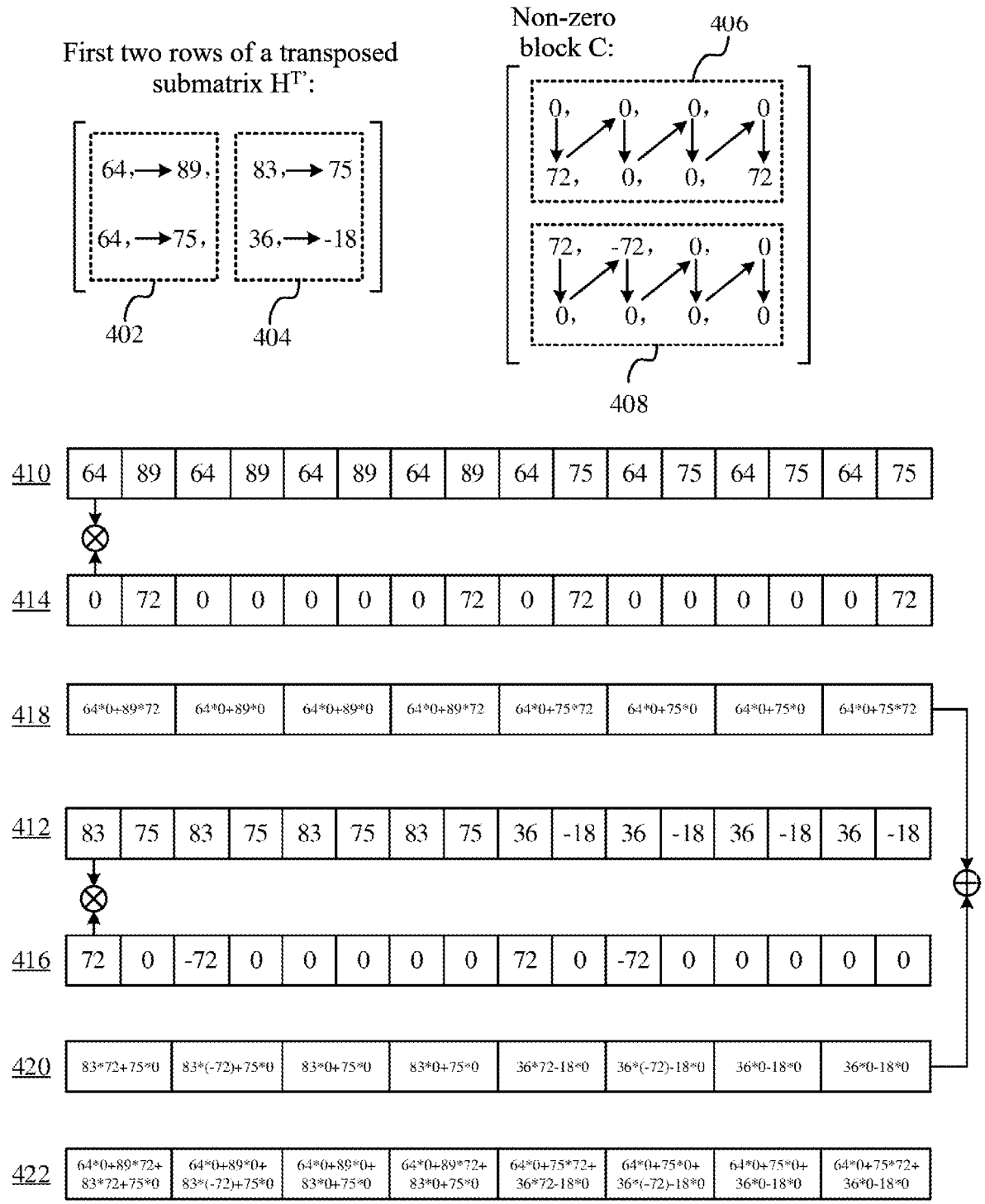
FIG. 4 is a schematic diagram of a process of calculating first two rows of elements in an intermediate matrix according to an embodiment of the present disclosure.

For step S354, elements in a second block 406 are rearranged in columns, that is, in the direction shown by the arrow in FIG. 4. In view of that a 256-bit register may be used in the AVX instruction, that is, 16 pieces of 2-byte data (or eight pieces of 4-byte data) may be subjected to parallel computing, the rearranged elements are copied twice to obtain a second row matrix 414. Similarly, elements in a second block 408 are rearranged by columns, that is, in the direction shown by the arrow in FIG. 4, and the rearranged elements are copied twice to obtain a second row matrix 416.

For step S355, in the matrix multiplication operation, the first block 402 corresponds to the second block 406, and the first block 404 corresponds to the second block 408.

Each element in the first row matrix 410, corresponding to the first two rows in the intermediate matrix, of the first block 402 is multiplied, based on the AVX instruction, by an element at a corresponding position in the second row matrix 414 of the corresponding second block 406, and then a sum of results obtained by performing the multiplication on two adjacent elements in the first row matrix 410 that are corresponding to each row in the first block 402 is calculated (a number of adjacent elements added is the same as the number of columns of the first block, that is, every two adjacent elements are added), to obtain a corresponding third row matrix 418.

Each element in the first row matrix 412, corresponding to the first two rows in the intermediate matrix, of the first block 404 is multiplied, based on the AVX instruction, by an element at a corresponding position in the second row matrix 416 of the corresponding second block 408, and then a sum of results obtained by performing the multiplication on two adjacent elements in the first row matrix 412 that are corresponding to each row in the first block 404 is calculated, to obtain a corresponding third row matrix 420.

For step S356, elements at corresponding positions in respectively corresponding third row matrices 418 and 420 of the first blocks 402 and 404 in the same row are added based on the AVX instruction, to obtain a row matrix 422 corresponding to the first two rows of elements (i.e., first and second rows of elements) in the intermediate matrix. Specifically, first four elements in the row matrix 422 are a first row of the intermediate matrix, and last four elements therein are a second row of the intermediate matrix.

In the similar method, third and fourth rows of elements, fifth and sixth rows of elements, and seventh and eighth rows of elements in the intermediate matrix can be calculated. Then first and second rows of elements, third and fourth rows of elements, fifth and sixth rows of elements, and seventh and eighth rows of elements are concatenated to obtain an intermediate matrix of 8*4.

It can be understood that the matrix multiplication operation (the transposed submatrix in steps S351 to S356 is replaced with the intermediate matrix and the non-zero block is replaced with the transform submatrix) may alternatively be performed on the intermediate matrix and the transform submatrix based on the SIMD instruction according to the method in the steps S351 to S356, to obtain every multiple adjacent rows of elements in the inverse transform result of the frequency coefficient matrix. Then, the every multiple adjacent rows of elements are concatenated to obtain the inverse transform result of the frequency coefficient matrix.

Figure 5:
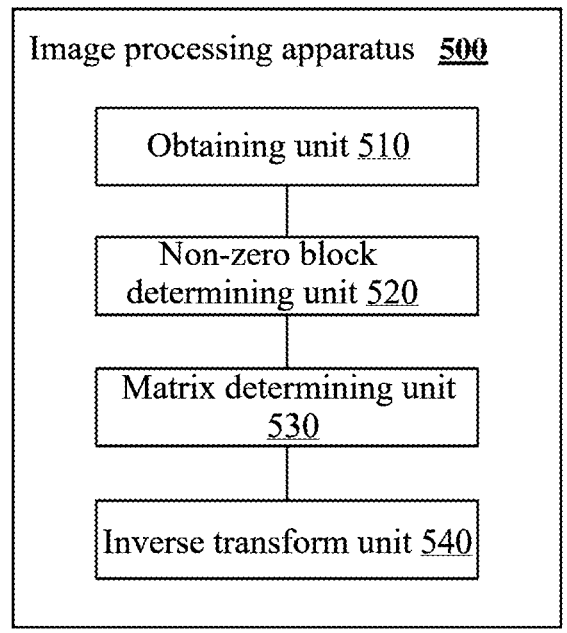
FIG. 5 is a block diagram of a structure of an image processing apparatus according to an embodiment of the present disclosure.

According to another aspect of the present disclosure, there is further provided an image processing apparatus. As shown in FIG. 5, the apparatus 500 may include: an obtaining unit 510 configured to obtain a frequency coefficient matrix of a target image, where the frequency coefficient matrix is obtained by performing frequency domain transform on the target image and includes at least one non-zero frequency coefficient; a non-zero block determining unit 520 configured to determine a non-zero block in the frequency coefficient matrix based on a position of the at least one non-zero frequency coefficient; a matrix determining unit 530 configured to determine a corresponding transform submatrix and a corresponding transposed submatrix of the non-zero block; and an inverse transform unit 540 configured to determine an inverse transform result of the frequency coefficient matrix based on the transform submatrix, the non-zero block, and the transposed submatrix.

According to this embodiment of the present disclosure, the non-zero block in the frequency coefficient matrix of the target image is determined, and calculation is only performed for the non-zero block to obtain the inverse transform result of the frequency coefficient matrix, without performing calculations for other frequency coefficients (i.e., frequency coefficients other than the non-zero block) in the frequency coefficient matrix, such that the calculation amount of inverse transform is greatly reduced, and the calculation efficiency of the inverse transform is improved, thereby improving the efficiency of image or video coding.

Figure 3:
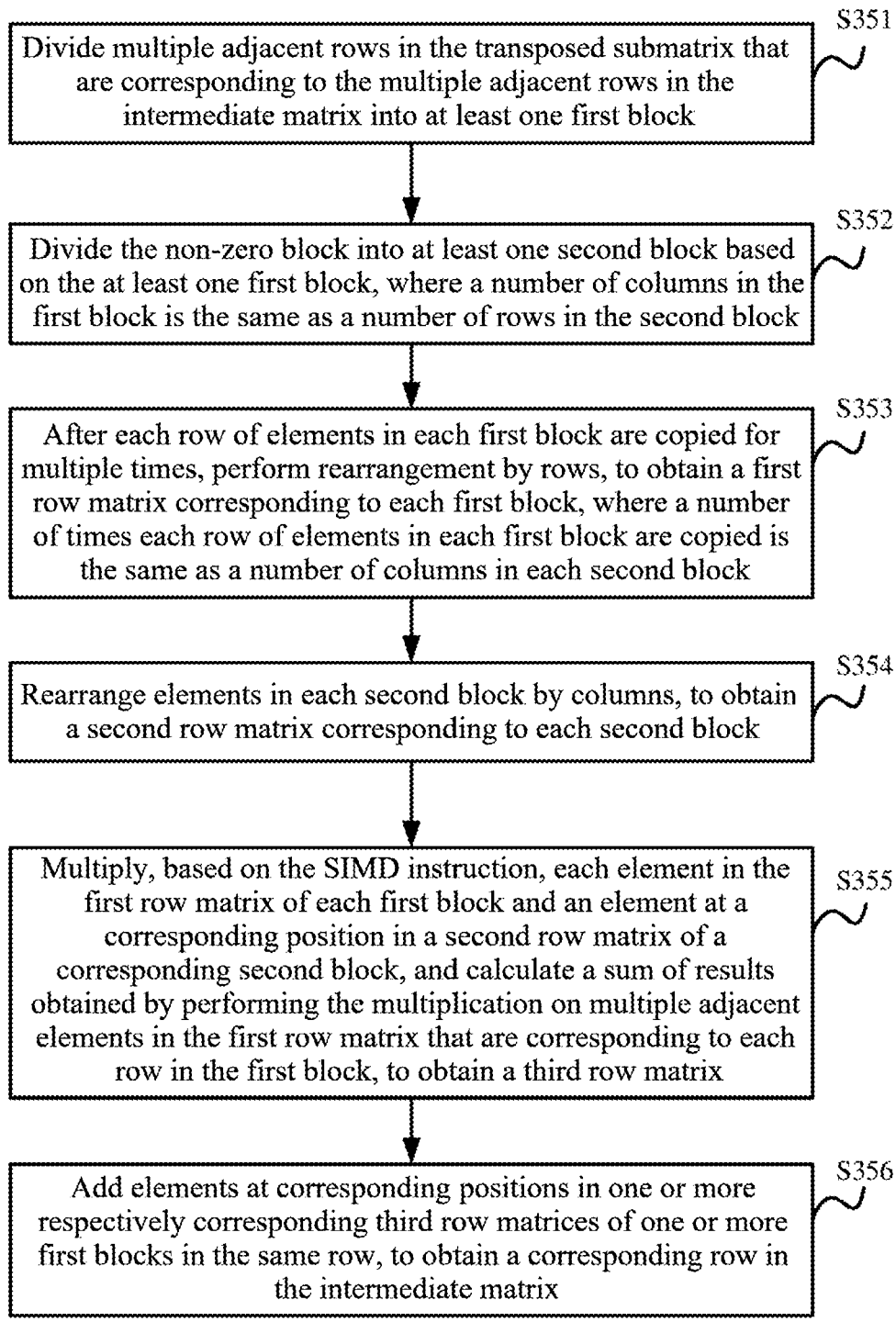
FIG. 3 is a flowchart of calculating every multiple adjacent rows of elements in an intermediate matrix according to an embodiment of the present disclosure.

It should be understood that the various units of the apparatus 500 shown in FIG. 5 may correspond to the steps in the method 200 described with reference to FIG. 3. Therefore, the operations, features, and advantages described for the method 200 above are also applicable to the apparatus 500 and the units included therein. For the sake of brevity, some operations, features, and advantages will not be repeated herein.

It should also be understood that herein, various technologies may be described herein in the general context of software and hardware elements or program modules. The various units described in FIG. 5 above may be implemented in hardware or in hardware combined with software and/or firmware. For example, these units may be implemented as computer program codes/instructions configured to be executed in one or more processors and stored in a computer-readable storage medium. Alternatively, these units may be implemented as hardware logics/circuits. For example, in some embodiments, one or more of the obtaining unit 510, the non-zero block determining unit 520, the matrix determining unit 530, and the inverse transform unit 540 may be implemented together in a system on chip (SoC). The SoC may include an integrated circuit chip (which includes a processor (such as a central processing unit (CPU), a microcontroller, a microprocessor, and a digital signal processor (DSP)), a memory, one or more communication interfaces, and/or one or more components in other circuits), and may optionally execute the received program codes and/or include embedded firmware to execute functions.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program, where when the computer program is executed by a processor, the above method is implemented.

According to another aspect of the present disclosure, there is further provided a computer program product, including a computer program, where when the computer program is executed by a processor, the above method is implemented.

Figure 6:
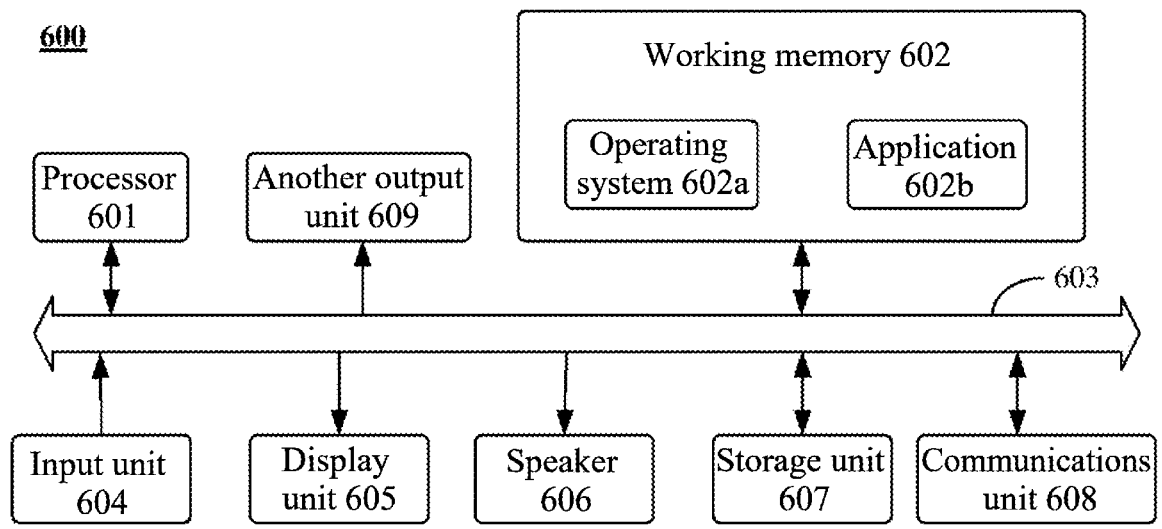
FIG. 6 is a block diagram of a structure of an exemplary electronic device that can be configured to implement an embodiment of the present disclosure.

Referring to FIG. 6, a structural block diagram of an electronic device 600 that may serve as a server computing device or a client computing device of the present disclosure is now described, which is an example of a hardware device that may be applied to various aspects of the present disclosure. The electronic device may be different types of computer device, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 6, the electronic device 600 may include at least one processor 601, a memory 602, an input unit 604, a display unit 605, a speaker 606, a storage unit 607, a communications unit 608 and other output unit 609 that can communicate with each other through a system bus 603.

The processor 601 may be a single processing unit or a plurality of processing units, and all the processing units may include a single computing unit or a plurality of computing units or a plurality of cores. The processor 6101 may be implemented as one or more microprocessors, microcomputers, micro-controllers, digital signal processors, central processing units, state machines, logic circuits, and/or any devices that manipulate signals based on operation instructions. The processor 601 may be configured to obtain and execute computer-readable instructions stored in the memory 602, the storage unit 607, or other computer-readable media, such as program codes of an operating system 602a, program codes of an application program 602b, etc.

The memory 602 and the storage unit 607 are examples of the computer-readable storage medium used for storing instructions, and the instructions are executed by the processor 601 to implement the various functions described above. The memory 602 may include both a volatile memory and a non-volatile memory (e.g. a RAM, a ROM, etc.). In addition, the storage unit 607 may include a hard disk drive, a solid state drive, a removable medium, including external and removable drives, a memory card, a flash memory, a floppy disk, an optical disk (e.g. CD, DVD), a storage array, a network attached storage, a storage area network, etc. The working memory 602 and the storage unit 607 may be collectively referred to herein as a memory or a computer-readable storage medium, and may be a non-transitory medium capable of storing computer-readable and processor-executable program instructions as computer program code. The computer program code may be executed by the processor 601 as a specific machine configured to implement the operations and functions described in the examples herein.

The input unit 606 may be any category of device capable of entering information to the electronic device 600. The input unit 606 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit may be any type of device capable of presenting information, and may include, but is not limited to, a display unit 605, a speaker 606 and other output unit 609, and other output unit 609 may include, but is not limited to, a video/audio output terminal, a vibrator, and/or a printer. The communications unit 608 allows the electronic device 600 to exchange information/data with other devices via a computer network such as the Internet and/or various telecommunications networks, and may include, but is not limited to, a modem, a network interface card, an infrared communications device, a wireless communications transceiver, and/or a chipset, for example, a Bluetooth™ device, an 1302.6 device, a Wi-Fi device, a WiMax device, a cellular communications device, and/or the like.

The application program 602b in the working register 602 can be loaded to execute various methods and processing described above, such as the steps S210 to S240 in FIG. 3. For example, in some embodiments, the method 200 described above may be implemented as a computer software program, which is tangibly contained in a machine-readable medium, such as the storage unit 607. In some embodiments, a part or all of the computer program may be loaded and/or installed onto the electronic device 600 via the storage unit 607 and/or the communications unit 608. The computer program, when loaded and executed by the processor 601, may perform one or more steps of the method 200 described above. Alternatively, in other embodiments, the processor 601 may be configured in any other suitable manner (for example, by means of firmware), to perform the method 200.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD)

monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely exemplary embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method of processing images, comprising:
performing frequency domain transform on a target image and obtaining a frequency coefficient matrix of the target image, wherein the frequency coefficient matrix comprises at least one non-zero frequency coefficient;
determining a non-zero block in the frequency coefficient matrix based on a position of the at least one non-zero frequency coefficient;
determining a transform submatrix corresponding to a size of the non-zero block and a transposed submatrix corresponding to the size of the non-zero block; and
determining an inverse transform result of the frequency coefficient matrix based on the transform submatrix, the non-zero block, and the transposed submatrix.

2. The method according to claim 1, wherein the determining a non-zero block in the frequency coefficient matrix based on a position of the at least one non-zero frequency coefficient comprises:
determining a maximum row coordinate value and a maximum column coordinate value that are corresponding to the at least one non-zero frequency coefficient; and
determining the non-zero block based on the maximum row coordinate value and the maximum column coordinate value.

3. The method according to claim 2, wherein the non-zero block comprises one or more frequency coefficients whose corresponding row coordinates are less than or equal to the maximum row coordinate value and whose corresponding column coordinates are less than or equal to the maximum column coordinate value in the frequency coefficient matrix.

4. The method according to claim 2, wherein the determining the non-zero block based on the maximum row coordinate value and the maximum column coordinate value comprises:
determining a maximum row boundary value of the non-zero block based on the maximum row coordinate value; and
determining a maximum column boundary value of the non-zero block based on the maximum column coordinate value,
wherein the maximum row boundary value is a minimum power of 2 that is greater than or equal to the maximum row coordinate value, and the maximum column boundary value is a minimum power of 2 that is greater than or equal to the maximum column coordinate value.

5. The method according to claim 4, wherein the non-zero block comprises all frequency coefficients whose row coordinates are less than or equal to the maximum row boundary value and whose column coordinates are less than or equal to the maximum column boundary value in the frequency coefficient matrix.

6. The method according to claim 4, wherein the determining an inverse transform result of the frequency coefficient matrix based on the transform submatrix, the non-zero block, and the transposed submatrix is performed in response to determining at least one of conditions:
the maximum row boundary value is less than a total number of rows in the frequency coefficient matrix; and
the maximum column boundary value is less than a total number of columns in the frequency coefficient matrix.

7. The method according to claim 1, wherein the determining an inverse transform result of the frequency coefficient matrix based on the transform submatrix, the non-zero block, and the transposed submatrix comprises:
performing a matrix multiplication operation on the transposed submatrix and the non-zero block based on a Single Instruction Multiple Data (SIMD) instruction to obtain an intermediate matrix; and
performing a matrix multiplication operation on the intermediate matrix and the transform submatrix based on the SIMD instruction to obtain the inverse transform result of the frequency coefficient matrix.

8. The method according to claim 7, wherein calculating multiple adjacent rows of elements in the intermediate matrix through the matrix multiplication operation comprises:
dividing multiple adjacent rows in the transposed submatrix that are corresponding to the multiple adjacent rows in the intermediate matrix into at least one first block;
dividing the non-zero block into at least one second block based on the at least one first block, wherein a number of columns in the first block is the same as a number of rows in the second block;
after each row of elements in each first block are copied for multiple times, performing rearrangement in rows to obtain a first row matrix corresponding to each first block, wherein a number of times each row of elements in each first block being copied is the same as a number of columns in each second block;
rearranging elements in each second block in columns to obtain a second row matrix corresponding to each second block;
multiplying, based on the SIMD instruction, each element in the first row matrix of each first block and an element at a corresponding position in a second row matrix of a corresponding second block, and calculating a sum of results obtained by performing the multiplication on multiple adjacent elements in the first row matrix that are corresponding to each row in the first block, to obtain a third row matrix; and
adding elements at corresponding positions in one or more respectively corresponding third row matrices of one or more first blocks in the same row, to obtain a corresponding row in the intermediate matrix.

9. The method according to claim 8, wherein the at least one second block is distributed along a row direction.

10. The method according to claim 8, wherein the at least one second block is distributed in a matrix.

11. The method according to claim 8, wherein the dividing multiple adjacent rows in the transposed submatrix that are corresponding to the multiple adjacent rows in the intermediate matrix into at least one first block, and the dividing the non-zero block into at least one second block comprises:
in response to determining that a number of rows in the non-zero block is greater than or equal to 2 and a number of columns therein is greater than or equal to 4, dividing the multiple adjacent rows in the transposed submatrix into at least one first block of 2*2, and dividing the non-zero block into at least one second block of 2*4.

12. The method according to claim 8, wherein the dividing multiple adjacent rows in the transposed submatrix that are corresponding to the multiple adjacent rows in the intermediate matrix into at least one first block, and the dividing the non-zero block into at least one second block comprises:
in response to determining that a number of rows in the non-zero block is greater than or equal to 2 and a number of columns therein is equal to 2, dividing the multiple adjacent rows in the transposed submatrix into at least one first block of 4*2, and dividing the non-zero block into at least one second block of 2*2.

13. The method according to claim 1,
wherein the method is applied to image decoding, and the target image is an image block in an image to be decoded; or
wherein the method is applied to video coding, and the target image is an image block in a video frame to be encoded or an image block in a video frame to be decoded.

14. An electronic device, comprising:
at least one processor; and
a memory communicatively connected to the at least one processor, wherein the memory stores a computer program that, when executed by the at least one processor, implements operations comprising:
performing frequency domain transform on a target image and obtaining a frequency coefficient matrix of the target image, wherein the frequency coefficient matrix comprises at least one non-zero frequency coefficient;
determining a non-zero block in the frequency coefficient matrix based on a position of the at least one non-zero frequency coefficient;
determining a transform submatrix corresponding to a size of the non-zero block and a transposed submatrix corresponding to the size of the non-zero block; and
determining an inverse transform result of the frequency coefficient matrix based on the transform submatrix, the non-zero block, and the transposed submatrix.

15. The electronic device according to claim 14, wherein the determining a non-zero block in the frequency coefficient matrix based on a position of the at least one non-zero frequency coefficient comprises:
determining a maximum row coordinate value and a maximum column coordinate value that are corresponding to the at least one non-zero frequency coefficient; and
determining the non-zero block based on the maximum row coordinate value and the maximum column coordinate value.

16. The electronic device according to claim 15, wherein the determining the non-zero block based on the maximum row coordinate value and the maximum column coordinate value comprises:
determining a maximum row boundary value of the non-zero block based on the maximum row coordinate value; and
determining a maximum column boundary value of the non-zero block based on the maximum column coordinate value,
wherein the maximum row boundary value is a minimum power of 2 that is greater than or equal to the maximum row coordinate value, and the maximum column boundary value is a minimum power of 2 that is greater than or equal to the maximum column coordinate value.

17. The electronic device according to claim 14, wherein the determining an inverse transform result of the frequency coefficient matrix based on the transform submatrix, the non-zero block, and the transposed submatrix comprises:
performing a matrix multiplication operation on the transposed submatrix and the non-zero block based on a Single Instruction Multiple Data (SIMD) instruction to obtain an intermediate matrix; and
performing a matrix multiplication operation on the intermediate matrix and the transform submatrix based on the SIMD instruction to obtain the inverse transform result of the frequency coefficient matrix.

18. A non-transitory computer-readable storage medium, storing a computer program, wherein the computer program, when executed by a processor, causes the processor to implement operations comprising:

performing frequency domain transform on a target image and obtaining a frequency coefficient matrix of the target image, wherein the frequency coefficient matrix comprises at least one non-zero frequency coefficient;

determining a non-zero block in the frequency coefficient matrix based on a position of the at least one non-zero frequency coefficient;

determining a transform submatrix corresponding to a size of the non-zero block and a transposed submatrix corresponding to the size of the non-zero block; and determining an inverse transform result of the frequency coefficient matrix based on the transform submatrix, the non-zero block, and the transposed submatrix.

19. The non-transitory computer-readable storage medium according to claim 18, wherein the determining a non-zero block in the frequency coefficient matrix based on a position of the at least one non-zero frequency coefficient comprises:

determining a maximum row coordinate value and a maximum column coordinate value that are corresponding to the at least one non-zero frequency coefficient; and determining the non-zero block based on the maximum row coordinate value and the maximum column coordinate value.

20. The non-transitory computer-readable storage medium according to claim 18, wherein the determining an inverse transform result of the frequency coefficient matrix based on the transform submatrix, the non-zero block, and the transposed submatrix comprises:

performing a matrix multiplication operation on the transposed submatrix and the non-zero block based on a Single Instruction Multiple Data (SIMD) instruction to obtain an intermediate matrix; and performing a matrix multiplication operation on the intermediate matrix and the transform submatrix based on the SIMD instruction to obtain the inverse transform result of the frequency coefficient matrix.

* * * * *